(12) United States Patent
Fendt

(10) Patent No.: US 10,207,634 B2
(45) Date of Patent: Feb. 19, 2019

(54) AUTOMATIC CONTROL OF A DIRECTION OF TRAVEL INDICATOR OF A VEHICLE

(71) Applicant: Conti Temic microelectronic GmbH, Nürnberg (DE)

(72) Inventor: Günter Anton Fendt, Schrobenhausen (DE)

(73) Assignee: Conti Temic microelectronic GmbH, Nürnberg (DE)

( * ) Notice: Subject to any disclaimer, the term of this patent is extended or adjusted under 35 U.S.C. 154(b) by 0 days.

(21) Appl. No.: 15/105,207

(22) PCT Filed: Feb. 3, 2015

(86) PCT No.: PCT/DE2015/200057
§ 371 (c)(1),
(2) Date: Jun. 16, 2016

(87) PCT Pub. No.: WO2015/131886
PCT Pub. Date: Sep. 11, 2015

(65) Prior Publication Data
US 2016/0311364 A1    Oct. 27, 2016

(30) Foreign Application Priority Data
Mar. 3, 2014  (DE) .......................... 10 2014 203 854

(51) Int. Cl.
*B60Q 1/40* (2006.01)
*B60Q 1/42* (2006.01)
*B60Q 1/34* (2006.01)

(52) U.S. Cl.
CPC .............. *B60Q 1/40* (2013.01); *B60Q 1/346* (2013.01); *B60Q 1/42* (2013.01)

(58) Field of Classification Search
CPC ............. B60Q 1/346; B60Q 1/40; B60Q 1/42
See application file for complete search history.

(56) References Cited

U.S. PATENT DOCUMENTS

| 4,638,290 A | * | 1/1987 | Wagner | ................... B60Q 1/40 200/61.35 |
| 5,438,314 A | | 8/1995 | Evans | |

(Continued)

FOREIGN PATENT DOCUMENTS

| DE | 4428369 | 2/1996 |
| DE | 102004004168 | 8/2005 |

(Continued)

OTHER PUBLICATIONS

Machine Translation of Yosuke JP11-070833.*

(Continued)

*Primary Examiner* — Andrew W Bee
(74) *Attorney, Agent, or Firm* — RatnerPrestia

(57) ABSTRACT

A method for automatically controlling a direction of travel indicator of a vehicle having the following steps: receiving a signal for the chronologically limited activation of the direction of travel indicator, chronologically limited activation of the direction of travel indicator after reception of the signal for the chronologically limited activation of the direction of travel indicator, starting a timer for a measurement interval after reception of the signal for the chronologically limited activation of the direction of travel indicator, checking a steering angle measurement signal during the measurement interval, and deactivation of the direction of travel indicator as a function of the checking of the steering angle measurement signal.

9 Claims, 2 Drawing Sheets

(56) References Cited

U.S. PATENT DOCUMENTS

| | | | |
|---|---|---|---|
| 5,528,218 A | 6/1996 | Rigsby | |
| 5,581,235 A | 12/1996 | Hollstein | |
| 2004/0100373 A1* | 5/2004 | Ponziani | B60Q 1/40 340/476 |
| 2004/0264209 A1* | 12/2004 | Okawa | B60Q 1/12 362/524 |
| 2005/0162266 A1* | 7/2005 | Mills | B60Q 1/40 340/476 |
| 2005/0200467 A1* | 9/2005 | Au | B60Q 1/34 340/465 |
| 2006/0054478 A1 | 3/2006 | Browne | |
| 2009/0045935 A1* | 2/2009 | Tsukida | B60Q 1/40 340/476 |
| 2010/0156621 A1* | 6/2010 | Nishimura | B60Q 1/42 340/476 |
| 2010/0219051 A1* | 9/2010 | Shimizu | B60Q 1/40 200/61.27 |
| 2010/0308988 A1* | 12/2010 | Ieda | B60Q 1/40 340/477 |
| 2014/0244109 A1* | 8/2014 | Tetsuka | B60Q 1/40 701/36 |
| 2015/0022336 A1* | 1/2015 | Mueller | B60Q 1/40 340/477 |
| 2015/0210208 A1* | 7/2015 | Suzuki | B60Q 1/42 340/476 |
| 2015/0266413 A1* | 9/2015 | Raubvogel | B60K 37/06 701/36 |

FOREIGN PATENT DOCUMENTS

| | | | |
|---|---|---|---|
| DE | 102013011586 | 3/2014 | |
| EP | 0696527 | 2/1996 | |
| FR | 2967376 | 5/2012 | |
| GB | 2351192 | 12/2000 | |
| JP | 11-070833 | * 3/1999 | B60Q 1/34 |

OTHER PUBLICATIONS

International Preliminary Report on Patentability and Written Opinion for International Application No. PCT/DE2015/200057, dated Sep. 6, 2016, 7 pages.

International Search Report and Written Opinion of the International Searching Authority for International Application No. PCT/DE2015/200057 dated Jun. 9, 2015.

German Examination Report for German Application No. 10 2014 203 854.5 dated Sep. 19, 2014.

* cited by examiner

AUTOMATIC CONTROL OF A DIRECTION OF TRAVEL INDICATOR OF A VEHICLE

CROSS REFERENCE TO RELATED APPLICATIONS

This application is the U.S. National Phase Application of PCT International Application No. PCT/DE2015/200057, filed Feb. 3, 2015, which claims priority to German Patent Application No. 10 2014 203 854.5, filed Mar. 3, 2014, the contents of such applications being incorporated by reference herein.

FIELD OF THE INVENTION

The invention relates to an automatic control of a direction of travel indicator of a vehicle according to the independent claims.

BACKGROUND OF THE INVENTION

Direction of travel indicators (so-called turn signals) of vehicles are manually controlled in most vehicles by the vehicle operator by means of control and/or turn signal levers. A continuous turn signal is usually deactivated by turning the steering wheel sufficiently far in the opposite direction to the direction of travel indicated by the turn signal, for example if, following a turning manoeuver, the vehicle is driven in a straight line again. Alternatively, the turn signal can also be manually deactivated by the vehicle operator by an appropriate actuation of the turn signal lever.

Modern control systems for direction of travel indicators also make possible a chronologically limited activation of the turn signal, which is provided in particular for lane changes. To this end, the vehicle operator only has to actuate the turn signal lever to the extent that the latter does not engage in the normal indicating position, in order to activate the chronologically limited turn signal. After a specified time interval has elapsed, generally after a few seconds, the turn signal is then automatically deactivated.

SUMMARY OF THE INVENTION

An aspect of this invention is now to further improve such an automatic control of a direction of travel indicator of a vehicle.

The disadvantage of the known chronologically limited activation of a turn signal which is explained above is that it cannot be deactivated so easily prior to the end of the specified time interval. If a vehicle operator decides, for example following the activation of the chronologically limited turn signal, against changing lanes, the turn signal nevertheless remains activated, which can be confusing for other road users. One of the underlying concepts of this invention is therefore to integrate a function into the automatic control of a direction of travel indicator, which guarantees that an activated, chronologically limited turn signal of a direction of travel indicator is controlled as a function of the turning of the steering wheel, which is detected via a steering wheel turning angle sensor. In particular, the aim with this function is to establish whether, following the chronologically limited activation of a turn signal, a corresponding change in direction of travel is actually also made, and as a function of this the turn signal shall be deactivated again if necessary. It can therefore be avoided, for example, in the situation described above that a vehicle indicates a lane change by means of a corresponding chronologically limited turn signal, but yet does not carry out a lane change.

One embodiment of the invention now relates to a method for automatically controlling a direction of travel indicator of a vehicle having the following steps: receiving a signal for the chronologically limited activation of the direction of travel indicator, chronologically limited activation of the direction of travel indicator after reception of the signal for the chronologically limited activation of the direction of travel indicator, starting a timer for a measurement interval after reception of the signal for the chronologically limited activation of the direction of travel indicator, checking a steering angle measurement signal during the measurement interval, and deactivation of the direction of travel indicator as a function of the checking of the steering angle measurement signal.

It can be checked during the measurement interval whether after starting the timer for the measurement interval the steering angle measurement signal signals a steering movement opposite to the signal received for the chronologically limited activation of the direction of travel indicator, and a deactivation signal is produced, if it is established that an opposite steering movement is signaled. The chronologically limited indicating signal can hereby be switched off again by means of "counter steering", for example if a lane change is aborted again by the driver, or if a lane change is made, and the vehicle is steered in a straight line again.

Alternatively or also additionally, it can be checked during the measurement interval whether the steering angle measurement signal a steering movement corresponding to the signal received for the chronologically limited activation of the direction of travel indicator within a specified period of time after starting the timer for the measurement interval, and a deactivation signal is produced, if it is established within the specified period of time that no corresponding steering movement is signaled. As a result, a chronologically limited indicating signal is automatically deactivated again prematurely, for example if no lane change is made.

A further embodiment of the invention relates to a device for automatically controlling a direction of travel indicator of a vehicle having a first timer for the chronologically limited activation of the direction of travel indicator after reception of a signal for the chronologically limited activation of the direction of travel indicator, a second timer for starting a measurement interval after reception of the signal for the chronologically limited activation of the direction of travel indicator, means for checking a steering angle measurement signal during the measurement interval and for producing a deactivation signal for the direction of travel indicator as a function of the checking of the steering angle measurement signal.

The means for checking can be configured to check, during the measurement interval, whether after starting the second timer the steering angle measurement signal signals a steering movement opposite to the signal received for the chronologically limited activation of the direction of travel indicator, and to produce the deactivation signal, if it is established that an opposite steering movement is signaled.

The means for checking can also be configured to check, during the measurement interval, whether the steering angle measurement signal a steering movement corresponding to the signal received for the chronologically limited activation of the direction of travel indicator within a specified period of time after starting the second timer for the measurement interval, and to produce the deactivation signal, if it is established within the specified period of time that no corresponding steering movement is signaled.

BRIEF DESCRIPTION OF THE DRAWINGS

Additional advantages and possible applications of this invention are set out in the following specification in conjunction with the embodiment example(s) shown in the figure(s).

The terms used and assigned reference numerals in the list of reference numerals indicated at the back of this specification are used in the specification, in the claims, in the abstract and in the figure(s), wherein:

DETAILED DESCRIPTION OF THE PREFERRED EMBODIMENTS

Figure 1:
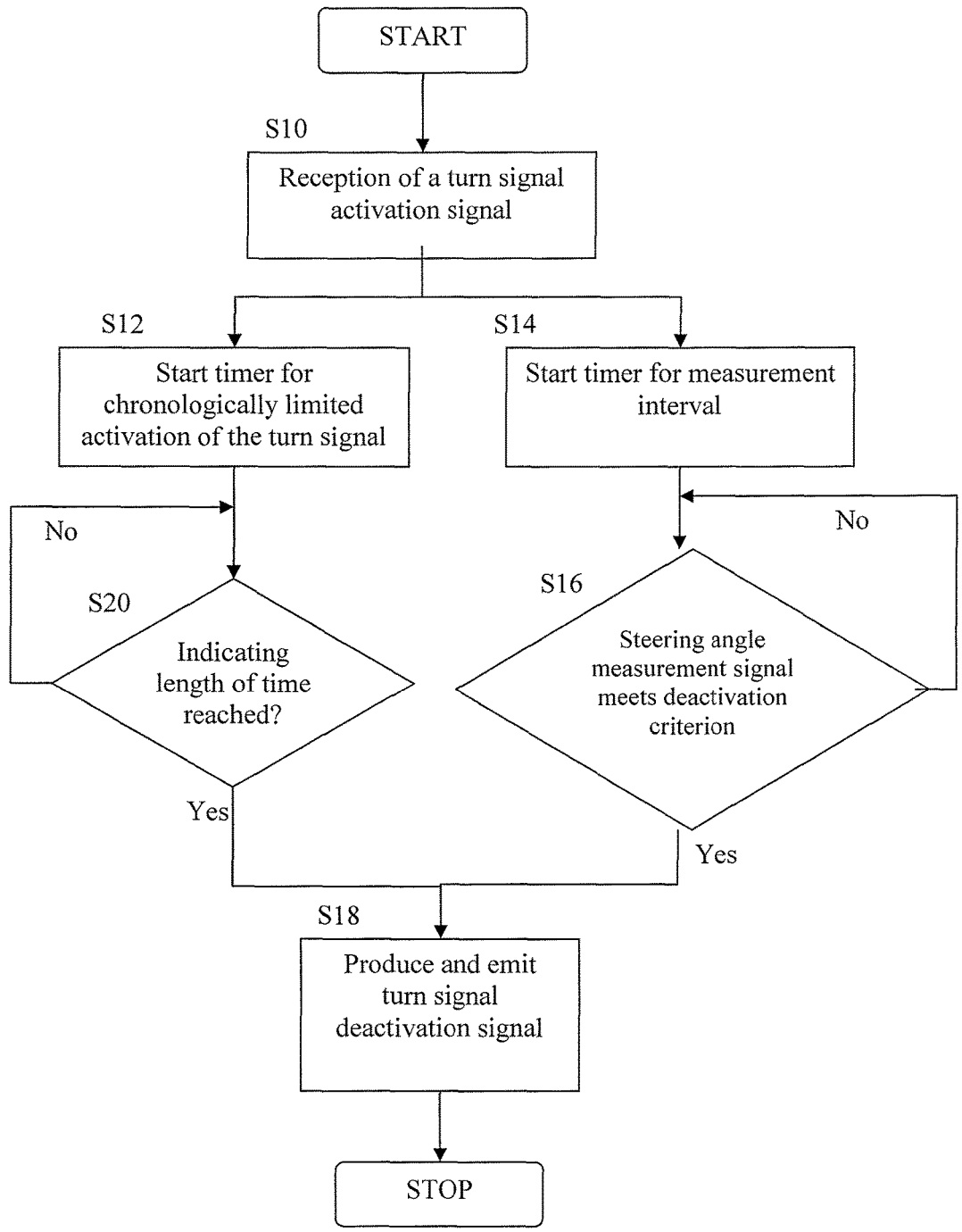
FIG. 1 shows a flowchart of an embodiment example of a method for automatically controlling a direction of travel indicator of a vehicle according to an aspect of the invention.

Similar, functionally similar and functionally related elements can be provided with the same reference numerals in the following specification. Absolute values are only indicated by way of example below and are not to be understood to limit the invention.

FIG. 1 shows a flowchart of an algorithm which implements the method according to an aspect of the invention for automatically controlling a direction of travel indicator of a vehicle and can be run, for example, by a controller of a control device for the direction of travel indicators, in order to produce control signals for the direction of travel indicators, in particular automatically a deactivation signal of a selected turn signal, as explained below in detail.

First of all, a signal for the chronologically limited activation of a turn signal, for example for a change to a left lane, is received in a step S10. The signal received is, for example, produced manually by a driver by briefly pressing that turn signal lever which activates the desired turn signal.

In a step S12 a timer is then started which runs for a specified length of time in order to activate the turn signal. It is checked in the subsequent step S20 whether this specified length of time has already been reached. If so, a turn signal deactivation signal for switching off the selected left turn signal is produced and emitted in a step S18. This procedure corresponds to the known chronologically limited indicator activation mentioned above.

Parallel to step S12 a timer for a measurement interval is now started according to the invention in a step S14. The measurement interval can, for example, be selected to be shorter than the above-mentioned specified indicating length of time and can be such that it is rather longer than a typical average for the delay, which occurs in the event of a lane change, until a corresponding steering movement is executed by the driver in order to initiate the lane change. The measurement interval can also, for instance, correspond to the specified indicating length of time.

During the measurement interval a steering angle measurement signal, which is produced for example by a steering wheel turning angle sensor, is checked in a step S16 to see whether it meets one or more deactivation criteria for the deactivation of the selected turn signal.

One deactivation criterion can, for example, be that after starting the timer for the measurement interval a steering movement opposite to the signal received for the chronologically limited activation of an indicator is signaled by the steering angle measurement signal, i.e. if the left turn signal was activated for a chronologically limited period, but the steering angle measurement signal signals a steering movement to the right. It can hereby be assumed that a driver is aborting the lane change by means of the opposite steering movement and therefore further indicating is no longer required.

One deactivation criterion can, for example, also be that within a specified period of time, for example a few seconds after starting the timer for the measurement interval, no steering movement corresponding to the signal received for the chronologically limited activation of a turn signal is signaled by the steering angle measurement signal, i.e. if the left turn signal was activated for a chronologically limited period, but the steering angle measurement signal does not signal a steering movement to the left within a few seconds of starting the measurement interval timer. In this case, it can be assumed that a driver does not wish to or cannot make a lane change and therefore further indicating is no longer required.

If it is established in step S16 that a deactivation criterion as explained above is met, step S18 which has already been described above is continued and a turn signal deactivation signal for switching off the selected left turn signal is produced and emitted.

Similarly, this method can also be used for the right turn signal, if e.g. on the highway an originally planned lane change to the right side/to a lane located on the right is aborted and/or not executed.

Figure 2:
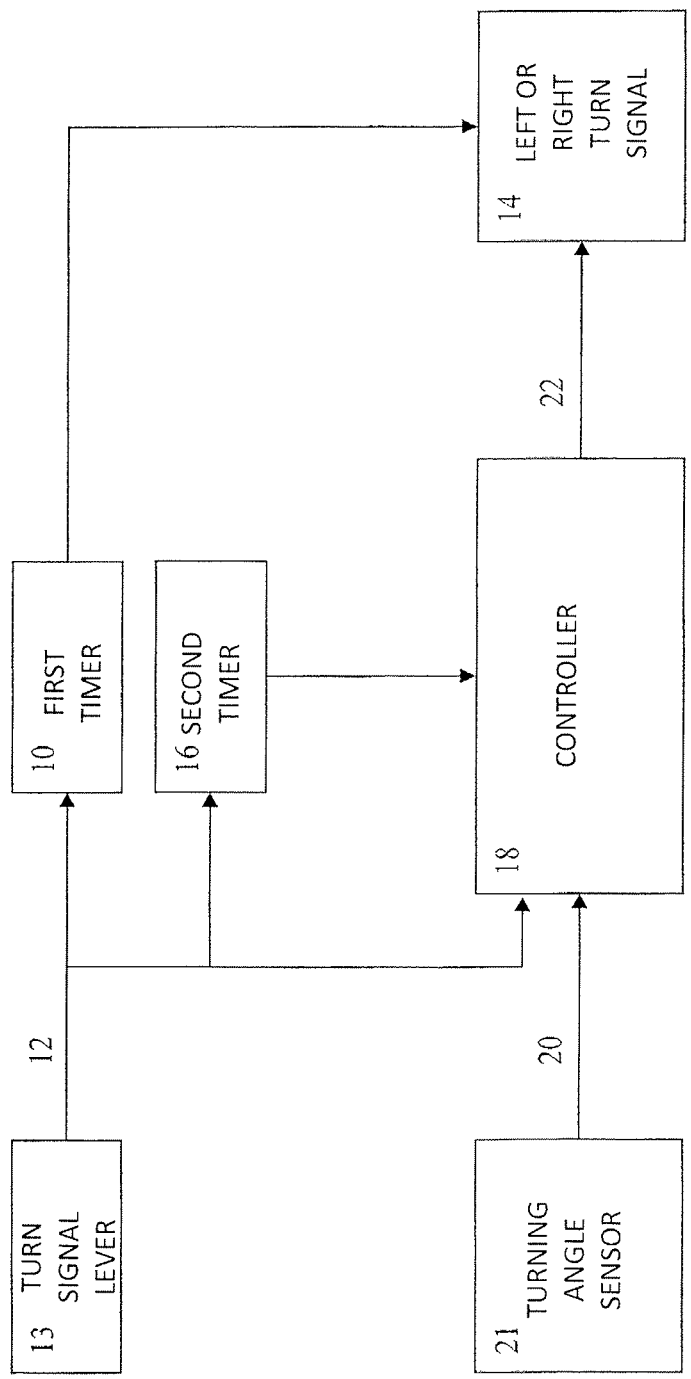
FIG. 2 shows a block diagram of an embodiment example of a device for automatically controlling a direction of travel indicator of a vehicle according to an aspect of the invention.

FIG. 2 shows a block diagram of a device for automatically controlling a direction of travel indicator of a vehicle having a first timer 10 for the chronologically limited activation of the direction of travel indicator after reception of a corresponding signal 12, which is produced by briefly pressing a turn signal lever 13 for the activation of the left or right turn signal 14 of a vehicle. In addition, a second timer 16 for starting a measurement interval is provided, to which the signal 12 which is produced by pressing the turn signal lever 13 is also supplied. On starting and on stopping the measurement interval, the second timer 16 produces a corresponding start or stop signal respectively, which is supplied to a controller 18 for the turn signal control. The controller 18 runs a program which implements an algorithm according to the method described above and having the steps shown in FIG. 1. The signal 12 and a steering angle measurement signal 20, which is produced and emitted by a steering wheel turning angle sensor 21 and reflects a steering movement by the driver, are supplied to the controller 18 as input signals. If the program run by the controller 18 establishes that during the ongoing measurement interval, the steering angle measurement signal 20 meets a deactivation criterion for the turn signal (in accordance with the above specification of the method having the steps shown in FIG. 1), the controller 18 produces a turn signal deactivation signal 22 which is supplied to the turn signal 14 and results in deactivation and/or switching off of the selected turn signal.

REFERENCE NUMERALS

10 First timer
12 Signal for the chronologically limited activation of an indicator
13 Turn signal lever
14 Direction of travel indicator (turn signal)
16 Second timer
18 Controller for the turn signal control
20 Steering angle measurement signal 21 Steering wheel turning angle sensor
22 Turn signal deactivation signal

The invention claimed is:

1. A method for automatically controlling a direction of travel indicator of a vehicle activated for signaling a lane change for a limited time, the method comprising:
   receiving a signal for a chronologically limited activation of the direction of travel indicator,
   performing chronologically limited activating of the direction of travel indicator after reception of the signal for the chronologically limited activation of the direction of travel indicator,
   starting a timer for a measurement interval after reception of the signal for the chronologically limited activation of the direction of travel indicator,
   checking a steering angle measurement signal indicating a steering movement during the measurement interval, and
   generating a deactivation signal and deactivating the direction of travel indicator as a function of the deactivation signal in response to the steering angle measurement signal indicating that the steering movement is opposite to the direction indicated by the direction of travel indicator,
   generating the deactivation signal and deactivating the direction of travel indicator as a function of the deactivation signal in response to the steering angle measurement signal indicating that a lane change of the vehicle is aborted, and
   generating the deactivation signal and deactivating the direction of travel indicator as a function of the deactivation signal in response the steering angle measurement signal indicating no corresponding steering movement during the measurement interval.

2. The method according to claim 1, further comprising:
   checking during the measurement interval whether after starting the timer for the measurement interval the steering angle measurement signal indicates a steering movement opposite to the direction indicated by the signal received for the chronologically limited activation of the direction of travel indicator, and
   producing a deactivation signal, if it is established that an opposite steering movement is signaled.

3. The method according to claim 1, further comprising:
   checking during the measurement interval whether the steering angle measurement signal indicates a steering movement corresponding to the signal received for the chronologically limited activation of the direction of travel indicator within a specified period of time after starting the timer for the measurement interval, and producing a deactivation signal if it is established within the specified period of time that no corresponding steering movement is signaled.

4. A device for automatically controlling a direction of travel indicator activated for signaling a lane change for a limited time, of a vehicle, the device comprising:
   a first timer for the chronologically limited activation of the direction of travel indicator after reception of a signal for the chronologically limited activation of the direction of travel indicator,
   a second timer for starting a measurement interval after reception of the signal for the chronologically limited activation of the direction of travel indicator, and
   means for checking a steering angle measurement signal indicating a steering movement during the measurement interval and for:
      generating a deactivation signal and deactivating the direction of travel indicator as a function of the deactivation signal in response to the steering angle measurement signal indicating that the steering movement is opposite to the direction indicated by the direction of travel indicator, and
      generating the deactivation signal and deactivating the direction of travel indicator as a function of the deactivation signal in response to the steering angle measurement signal indicating that a lane change of the vehicle is aborted, and
      generating the deactivation signal and deactivating the direction of travel indicator as a function of the deactivation signal in response the steering angle measurement signal indicating no corresponding steering movement during the measurement interval.

5. The device according to claim 4, wherein the means for checking are configured to check, during the measurement interval, whether the steering angle measurement signal signals a steering movement opposite to the direction indicated by the signal received for the chronologically limited activation of the direction of travel indicator after starting the second timer, and to produce the deactivation signal, if it is established that an opposite steering movement is signaled.

6. The device according to claim 5, wherein the means for checking are configured to check, during the measurement interval, whether the steering angle measurement signal signals a steering movement corresponding to the signal received for the chronologically limited activation of the direction of travel indicator within a specified period of time after starting the second timer, and to produce the deactivation signal, if it is established within the specified period of time that no corresponding steering movement is signaled.

7. The method according to claim 2, further comprising:
   checking during the measurement interval whether the steering angle measurement signal indicates a steering movement corresponding to the signal received for the chronologically limited activation of the direction of travel indicator within a specified period of time after starting the timer for the measurement interval, and producing a deactivation signal if it is established within the specified period of time that no corresponding steering movement is signaled.

8. The device according to claim 4, wherein the means for checking are configured to check, during the measurement interval, whether the steering angle measurement signal signals a steering movement corresponding to the signal received for the chronologically limited activation of the direction of travel indicator within a specified period of time after starting the second timer, and to produce the deactivation signal, if it is established within the specified period of time that no corresponding steering movement is signaled.

9. The method according to claim 1, further comprising:
   generating the deactivation signal and deactivating the direction of travel indicator as a function of the deactivation signal in response to the steering movement steering the vehicle in a straight direction.

* * * * *